W. M. STANTON.
MEAT CHOPPER AND TENDERER.
APPLICATION FILED FEB. 19, 1912.
1,025,654.
Patented May 7, 1912.
2 SHEETS—SHEET 2.
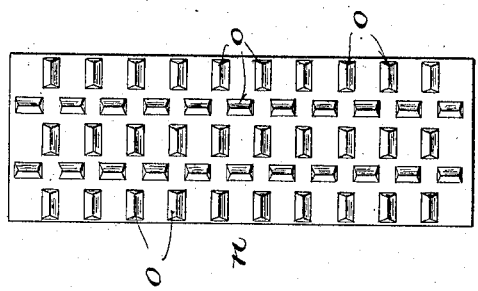
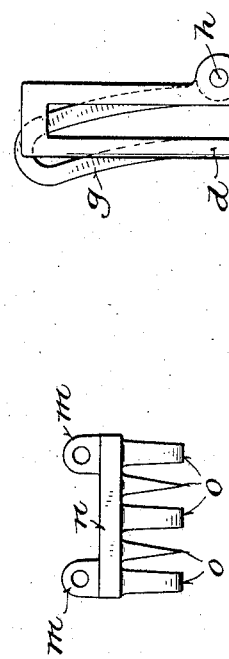
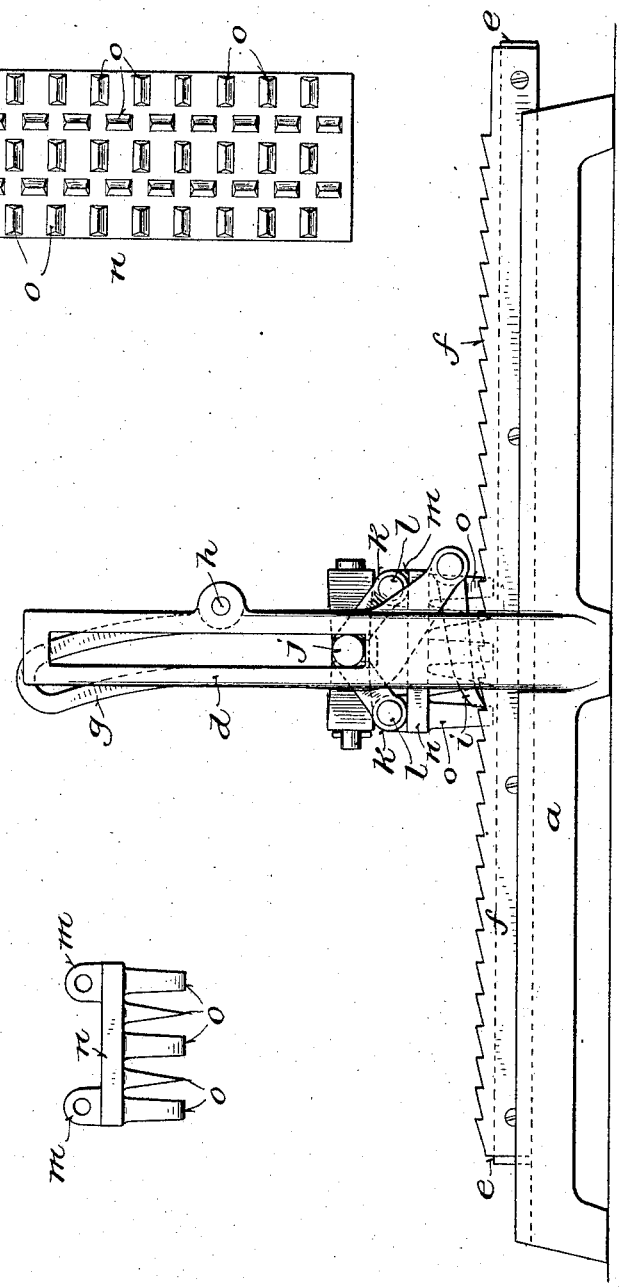

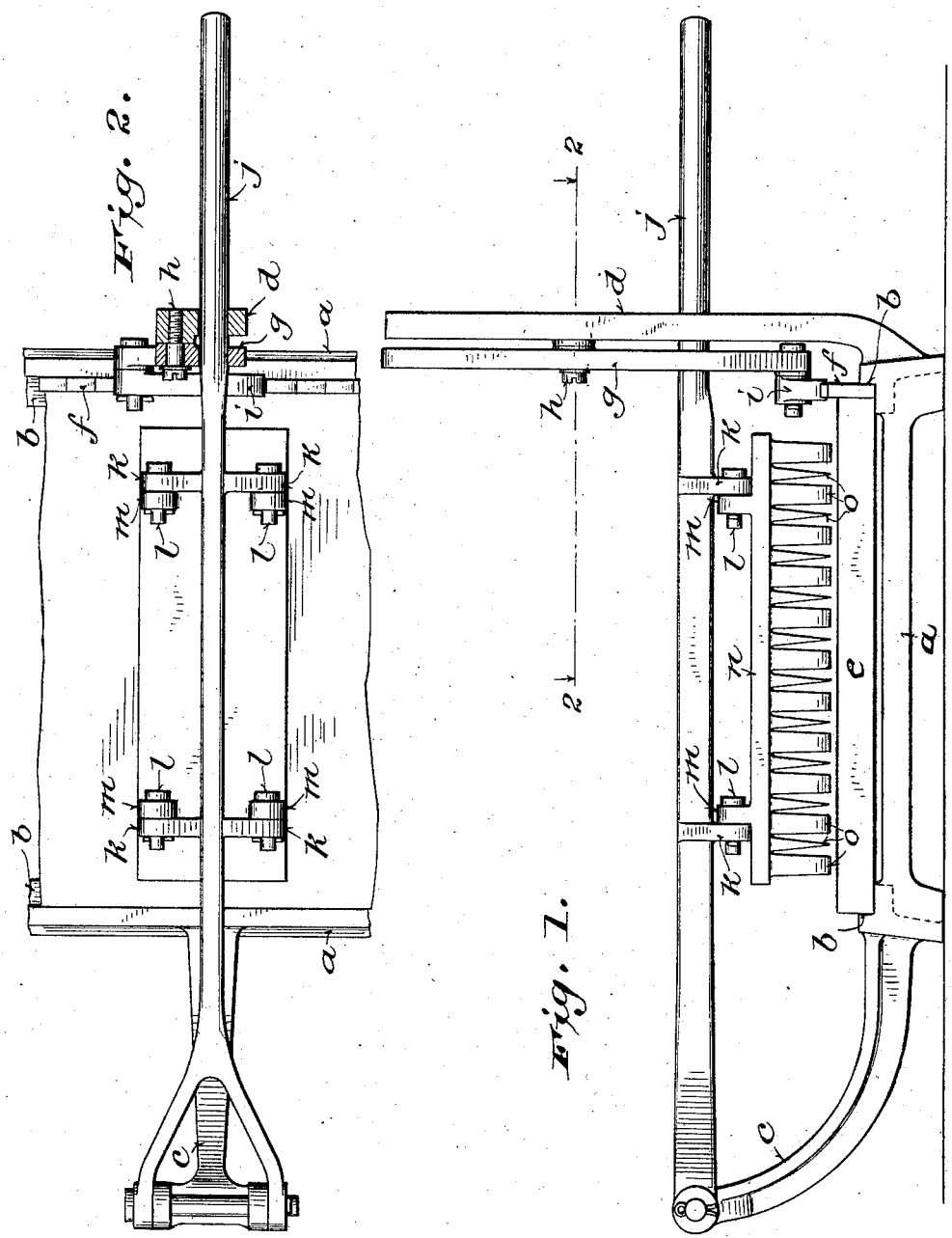

UNITED STATES PATENT OFFICE.

WILLIAM M. STANTON, OF MILWAUKEE, WISCONSIN.

MEAT CHOPPER AND TENDERER.

1,025,654.　　　　　Specification of Letters Patent.　　Patented May 7, 1912.

Application filed February 19, 1912. Serial No. 678,660.

*To all whom it may concern:*

Be it known that I, WILLIAM M. STANTON, a citizen of the United States, residing at Milwaukee, in the county of Milwaukee and State of Wisconsin, have invented certain new and useful Improvements in Meat Choppers and Tenderers, of which the following is a specification, reference being had to the accompanying drawing, forming a part thereof.

The main objects of this invention are to sever the tendons, sinews or fibers of meat and particularly of the cheaper cuts or grades, such as round steak, so as to render them tender preparatory to cooking; to facilitate sharpening and renewing the knives; and generally to improve the construction and operation of devices for this purpose.

It consists in the construction, arrangement and combination of parts as hereinafter particularly described and pointed out in the claims.

In the accompanying drawing like characters designate the same parts in the several figures.

Figure 1 is a side elevation of a machine embodying the invention; Fig. 2 is a partial plan view and horizontal section on the line 2 2, Fig. 1; Fig. 3 is a front elevation of the machine as viewed from the right relative to Figs. 1 and 2; Fig. 4 is an end elevation of the cutter head detached from the lever handle; and Fig. 5 is an inverted plan view of the same, showing the arrangement of the blades.

The machine comprises a frame $a$, which may be conveniently cast in one piece with parallel horizontal ways $b$, a rearwardly extending and upwardly bent arm $c$ on the rear side, and a vertically slotted guide $d$ on the front side. A table $e$ for holding and guiding the meat to be treated in position to be operated upon by the blades of the cutter head is fitted to slide in the ways $b$ and is provided on the front side with a rack $f$. The table itself may be made of wood, while the rack is made of metal and fastened thereto by screws, as shown in Fig. 3, or by other suitable means. A lever $g$, formed with a curved longitudinal slot, is pivoted at one side thereof and between its ends to the guide $d$ by a screw or pin $h$, so that the curved slot will coincide for a part of its length with the slot in said guide, as shown in Fig. 3. To the lower end of this lever, which is preferably bent to one side in the direction of the adjacent way $b$, is pivoted a pawl $i$, adapted to work with the rack $f$.

A vertically movable hand lever $j$, fulcrumed at one end to the arm $c$, extends forwardly therefrom over and transversely to the ways $b$ and through the slots in the lever $g$ and guide $d$, in which it works freely up and down. The arm $c$ and lever $j$ are preferably forked at their connected ends, as shown in Fig. 2, to afford a wide fulcrum bearing and steady support for the hand lever. The lever $j$ is formed or provided with cross arms $k$, to which are detachably fastened by pins or bolts $l$, upwardly projecting ears $m$, on a cutter head or plate $n$, which is formed or provided on its lower side with chisel pointed blades $o$. These blades are staggered or arranged as shown in Figs. 1, 4 and 5, in alternate rows, with their cutting edges crosswise and lengthwise of the head or plate $n$, so as to more effectively sever the fibers of the meat.

In the operation of the machine the table $e$ as viewed in Fig. 3, is withdrawn to the right, the pawl $i$ being lifted out of engagement with the rack $f$. The meat to be chopped is placed thereon and the pawl $i$ being placed in engagement with the rack $f$, the hand lever $j$ is worked up and down in the guide $d$. This operates through the lever $g$ to advance the table $e$ with the meat thereon, step by step underneath the blades $o$, which closely perforate or pierce the meat, making short transverse cuts therein in different directions, according to the arrangement of the blades. The upward movement of the hand lever $j$ by its engagement with the upper end of the lever $g$ above its pivot or fulcrum $h$, advances the pawl $i$, and with it the table $e$, an interval. The downward movement of said lever $j$ engaging with the lower part of the lever $g$, withdraws the pawl $i$ into engagement with another tooth of the rack $f$, and at the same time thrusts the blades $o$ into the meat. These operations are repeated as many times as may be required to render the meat tender, the pawl $i$ being lifted out of engagement with the rack $f$ and the table withdrawn to its starting point after each passage of the meat under the cutter head, as many times as may be necessary or desirable. The cutter head $n$ being detachably fastened to the hand lever, can be easily removed for sharpening the blades or replacing a defective head, and the blades o being arranged in rows, can be easily ground or filed off on their flat sides to sharpen them.

Various changes in the minor details of construction and arrangement of parts may be made without affecting the operation of the machine or departing from the principle of the invention as defined in the following claims.

I claim:

1. In a meat chopper and tenderer the combination of a frame having parallel horizontal ways and an upright guide at one side, a table fitted to slide on said ways and provided with a rack, a curved lever pivoted to said guide and provided with a pivoted pawl arranged to work with said rack, a lever handle fulcrumed to the frame and having sliding engagement with said guide and curved lever, and a cutter head carried by said lever handle and provided with blades arranged to coöperate with said table.

2. In a meat chopper and tenderer the combination of a frame having parallel horizontal ways and provided on one side with a transverse arm and on the other side with a vertical longitudinally slotted guide, a table fitted to slide on said ways and provided at one side with a rack, a curved longitudinally slotted lever fulcrumed between its ends to one side of said guide and provided at its lower end with a pivoted pawl arranged to work with said rack, a lever handle fulcrumed at one end to said arm and extending therefrom transversely over said ways through the slots in said guide and curved lever, and a cutter head carried by said lever handle and provided on the under side with blades arranged to coöperate with said table.

3. In a meat chopper and tenderer the combination of a frame having parallel horizontal ways, a table fitted to slide on said ways, a vertically movable lever extending over said ways transversely thereto and having an actuating connection with said table, and a cutter head carried by said lever and provided with chisel pointed blades arranged alternately with their cutting edges transverse to one another.

4. In a meat chopper and tenderer the combination of a frame having parallel horizontal ways, a table fitted to slide on said ways and provided at one side with a rack, a lever provided with a pawl adapted to work with said rack, a vertically movable lever fulcrumed on said frame and adapted by engagement with the other lever to reciprocate said pawl and intermittently advance the table, and a cutter head detachably fastened to the vertically movable lever over the path of said table and provided on the under side with a plurality of cutting blades.

In witness whereof I hereto affix my signature in presence of two witnesses.

WILLIAM M. STANTON.

Witnesses:
BURTON ALLEE,
LUTHER S. LAKE.

Copies of this patent may be obtained for five cents each, by addressing the "Commissioner of Patents, Washington, D. C."